US009599268B2

(12) United States Patent
King et al.

(10) Patent No.: US 9,599,268 B2
(45) Date of Patent: Mar. 21, 2017

(54) FITTINGS FOR PIPES, AND PRESSES FOR INSTALLING THE FITTINGS TO PIPES

(71) Applicants: Thomas A. King, Ballwin, MO (US); Duane K. Smith, St. Charles, MO (US)

(72) Inventors: Thomas A. King, Ballwin, MO (US); Duane K. Smith, St. Charles, MO (US)

( * ) Notice: Subject to any disclaimer, the term of this patent is extended or adjusted under 35 U.S.C. 154(b) by 55 days.

(21) Appl. No.: 14/568,952

(22) Filed: Dec. 12, 2014

(65) Prior Publication Data

US 2015/0167884 A1   Jun. 18, 2015

Related U.S. Application Data

(60) Provisional application No. 61/915,881, filed on Dec. 13, 2013.

(51) Int. Cl.
| | |
|---|---|
| *F16L 41/00* | (2006.01) |
| *F16L 41/04* | (2006.01) |
| *B26F 1/00* | (2006.01) |
| *F16L 41/12* | (2006.01) |

(52) U.S. Cl.
CPC .......... *F16L 41/045* (2013.01); *B26F 1/0015* (2013.01); *F16L 41/12* (2013.01); *Y10T 137/6123* (2015.04)

(58) Field of Classification Search
CPC ....... F16L 29/002; F16L 41/04; F16L 41/045; F16L 41/06; F16L 41/065; F16L 47/34; F16L 37/345; F16L 41/14; F16L 41/03; F16L 41/12; Y10T 137/6123; B26F 1/0015
USPC .................. 285/197, 198; 137/317
See application file for complete search history.

(56) References Cited

U.S. PATENT DOCUMENTS

| | | | | |
|---|---|---|---|---|
| 3,448,758 A | * | 6/1969 | Mullins ................. | F16L 41/065 137/318 |
| 3,554,217 A | * | 1/1971 | Ehrens .................... | F16L 41/06 137/318 |
| 3,732,886 A | * | 5/1973 | Mullins ................. | F16L 41/045 137/318 |
| 3,901,268 A | * | 8/1975 | Mullins ................. | F16L 41/045 137/318 |
| 3,920,037 A | * | 11/1975 | Hoff ..................... | A01G 25/023 137/318 |

(Continued)

FOREIGN PATENT DOCUMENTS

| | | |
|---|---|---|
| WO | WO 2015/089410 A2 | 6/2015 |
| WO | WO 2016/081877 A1 | 5/2016 |

*Primary Examiner* — Beth Stephan
(74) *Attorney, Agent, or Firm* — Harness, Dickey & Pierce, P.L.C.

(57) ABSTRACT

A fitting for a pipe generally includes a saddle for coupling the fitting to the pipe and a tap for establishing fluid communication between the fitting and the pipe. The saddle defines a channel extending generally longitudinally through the saddle, and the channel is free of threads. And, the tap is configured to couple to the saddle within the channel of the saddle. A press for installing the fitting to the pipe generally includes a housing configured to releasably couple to the fitting, and a spike configured to releasably couple to the housing and extend at least partly through the fitting for piercing the pipe to thereby allow at least part of the fitting to be inserted into the pipe through the piercing in the pipe to thereby establishing fluid communication between the fitting and the pipe.

22 Claims, 16 Drawing Sheets

(56) References Cited

U.S. PATENT DOCUMENTS

| | | | | |
|---|---|---|---|---|
| 4,112,944 | A * | 9/1978 | Williams | A61B 17/122 |
| | | | | 137/318 |
| 4,522,339 | A * | 6/1985 | Costa | B05B 15/069 |
| | | | | 137/318 |
| 4,574,477 | A * | 3/1986 | Lemkin | B26F 1/0015 |
| | | | | 30/124 |
| 5,353,831 | A * | 10/1994 | Roth | F16L 41/065 |
| | | | | 137/318 |
| 5,694,972 | A * | 12/1997 | King | A01G 25/023 |
| | | | | 137/318 |
| 6,216,723 | B1 * | 4/2001 | King | F16L 47/34 |
| | | | | 137/318 |
| 6,454,312 | B1 * | 9/2002 | Desorcy | F16L 41/12 |
| | | | | 248/62 |
| 6,681,796 | B2 * | 1/2004 | King, Jr. | F16L 41/065 |
| | | | | 137/107 |
| 6,773,036 | B1 | 8/2004 | King | |
| 6,986,532 | B1 | 1/2006 | King | |
| 7,150,289 | B2 * | 12/2006 | Mortensen | F16L 47/345 |
| | | | | 137/318 |
| 7,150,476 | B2 * | 12/2006 | King | F16L 47/345 |
| | | | | 285/197 |
| 7,219,684 | B2 | 5/2007 | Dabir et al. | |
| 7,946,010 | B1 * | 5/2011 | Myers | B26F 1/0015 |
| | | | | 29/213.1 |
| 8,172,276 | B1 | 5/2012 | King et al. | |
| 2006/0027266 | A1 | 2/2006 | Kim et al. | |
| 2006/0065306 | A1 * | 3/2006 | Mortensen | F16L 47/345 |
| | | | | 137/318 |
| 2009/0145488 | A1 | 6/2009 | Hoskisson et al. | |
| 2015/0300543 | A1 | 10/2015 | Boaz et al. | |
| 2016/0146388 | A1 | 5/2016 | Smith et al. | |

\* cited by examiner

FITTINGS FOR PIPES, AND PRESSES FOR INSTALLING THE FITTINGS TO PIPES

CROSS-REFERENCE TO RELATED APPLICATION

This application claims the benefit of, and priority to, U.S. Provisional Application No. 61/915,881, filed on Dec. 13, 2013. The entire disclosure of the above application is incorporated herein by reference.

FIELD

The present disclosure generally relates to fitting assemblies for pipes and, more specifically, to fittings (e.g., saddle tee and tap fittings, etc.) for pipes in irrigation systems for making fluid connections between irrigation pipes and sprinklers, etc. and to presses for use in installing the fittings to the pipes for making the fluid connections.

BACKGROUND

This section provides background information related to the present disclosure which is not necessarily prior art.

Pipe fittings are often used to connect pipes to one or more other pipes. And in irrigation systems, for example, pipe fittings may further be used for connecting pipes to one or more irrigation sprinklers (e.g., via pipes, directly to the irrigation sprinklers, etc.).

SUMMARY

This section provides a general summary of the disclosure, and is not a comprehensive disclosure of its full scope or all of its features.

Example embodiments of the present disclosure generally relate to fittings for pipes. In one example embodiment, such a fitting generally includes a saddle for coupling the fitting to a pipe and a tap for establishing fluid communication between the fitting and the pipe. The saddle defines a channel extending generally longitudinally through the saddle, and the channel is free of threads. And, the tap is configured to couple to the saddle within the channel of the saddle.

In another example embodiment, a fitting generally includes a saddle for coupling the fitting to a pipe where the saddle define a channel extending generally longitudinally through the saddle, and a tap for establishing fluid communication between the fitting and the pipe where the tap is free of threads and is configured to snap-fit couple to the saddle within the channel of the saddle.

In still another example embodiment, a low-profile fitting generally includes a saddle having a body and a clamp where the body defines a channel extending generally longitudinally through the body and the clamp is configured to couple the saddle to a pipe and where the body defines a height that is less than a height of the clamp, and a tap for establishing fluid communication with the pipe where the tap is configured to couple to the saddle within the channel of the body of the saddle.

Example embodiments of the present disclosure also generally relate to presses for installing fittings to pipes for establishing fluid communication between the fittings and the pipes. In one example embodiment, a press generally includes a housing configured to releasably couple to the fitting, and a spike configured to releasably couple to the housing and extend at least partly through the fitting for piercing the pipe and to thereby allow at least part of the fitting to be inserted into the pipe through the piercing in the pipe for establishing fluid communication between the fitting and the pipe.

In another example embodiment, a press generally includes a spike having a grip portion, a shaft, and a fastener coupling the shaft to the grip portion, whereby the press can be used to install a tap of a fitting in a pipe.

In still another example embodiment, a press generally includes a housing, and a spike having a grip portion and a tip where the spike is configured to releasably couple to the housing and move relative to the housing.

Example embodiments of the present disclosure also generally relate to fitting assemblies for use with irrigation systems. In one example embodiment, a fitting assembly generally includes a fitting having a saddle for coupling the fitting to a pipe and a tap configured to couple to the saddle for establishing fluid communication with the pipe, and a press configured to releasably couple to the saddle and pierce the pipe to thereby allow the tap to be inserted into the pierced pipe for establishing the fluid communication with the pipe.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

FIGS. 1-7 illustrate an example embodiment of a fitting 100 including one or more aspects of the present disclosure. The fitting 100 is configured (e.g., sized, shaped, etc.) to couple to a pipe 101 (e.g., a main irrigation line, etc.) at a desired location along the pipe 101 to thereby create a fluid connection between the pipe 101 and one or more other devices coupled to the fitting 100 (e.g., other pipes, sprinklers, valves, etc.). Pipes, as used herein, may include, for example, irrigation pipes, lines, tubing, etc. and may be used, for example, for transporting fluid (e.g., liquid, gas, etc.), etc. between desired locations. In addition, the pipes may be constructed from any suitable material including, for example, polyethylene, polypropylene, polyvinyl chloride, etc.

Figure 1:
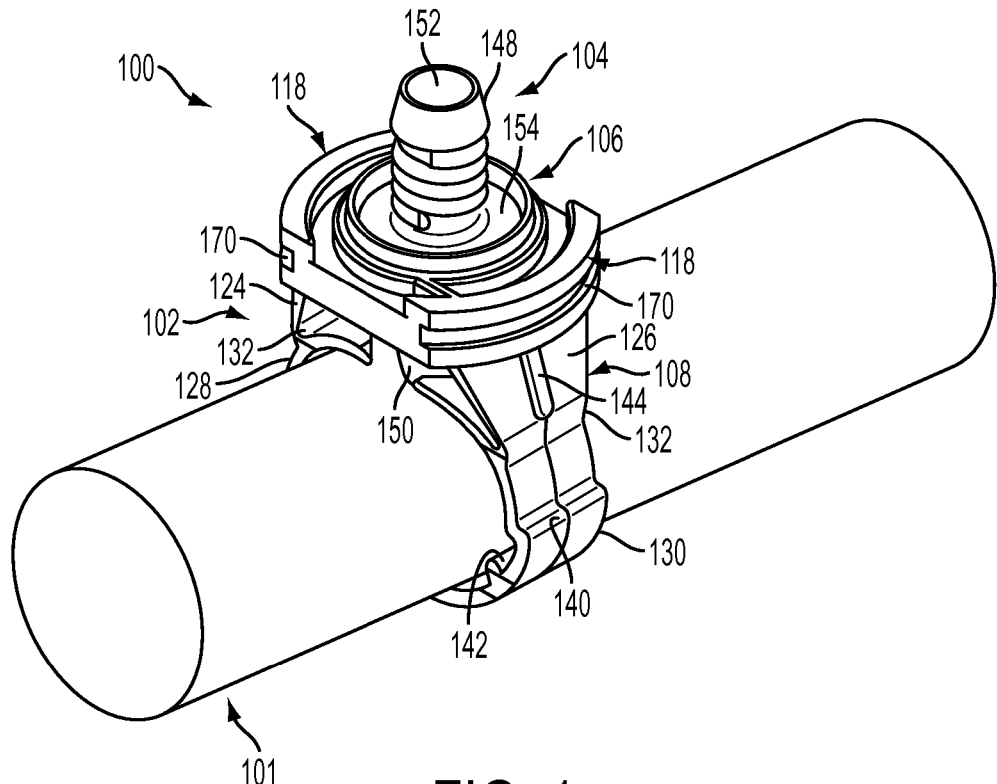
FIG. 1 is a perspective view of a fitting according to an example embodiment of the present disclosure shown installed to a pipe.

As shown in FIG. 1, the illustrated fitting 100 generally includes a saddle 102 and a tap 104. The saddle 102 is configured to fit over the pipe 101 and couple the fitting 100 to the pipe 101. And, the tap 104 is configured to couple to the saddle 102 (such that the saddle 102 holds the tap 104 in place relative to the pipe 101) and make the fluid connection between the pipe 101 and the one or more other devices coupled to the tap 104. As such, when the fitting 100 is installed to the pipe 101, fluid in the pipe 101 can flow through the tap 104 to the one or more other devices coupled to the tap 104.

In the illustrated embodiment, the fitting 100 is configured as a saddle tee fitting for use in irrigation systems. However, it should be appreciated that aspects of the present disclosure may also apply to other fittings (e.g., fittings other than saddle tee fittings, etc.) within the scope of the present disclosure. In addition, it should be appreciated that aspects of the present disclosure may also be implemented in applications other than those involving irrigation systems (e.g., other systems requiring fittings coupled to pipes such as, for example, plumbing systems, etc.) within the scope of the present disclosure. Also in the illustrated embodiment, the tap 104 is generally straight in shape. In other example embodiments, fittings may include taps with other shapes such as, for example, elbow shapes, S-shapes, T-shapes, etc. and/or taps having other sizes than illustrated herein.

Figure 2:
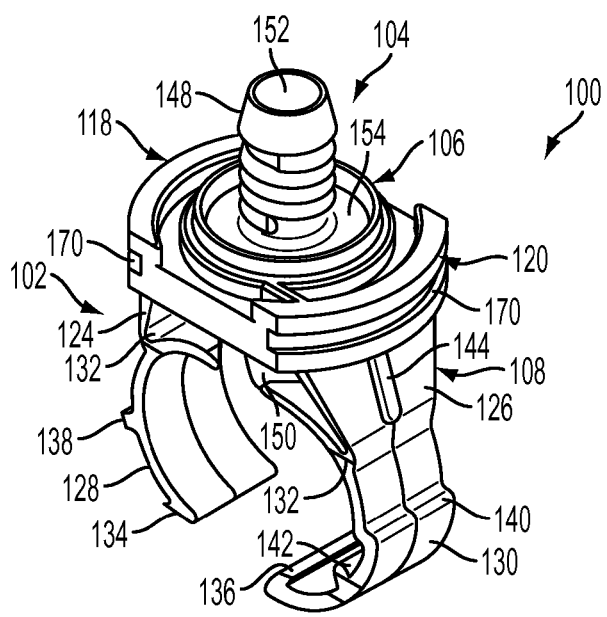
FIG. 2 is a perspective view of the fitting of FIG. 1.
Figure 3:
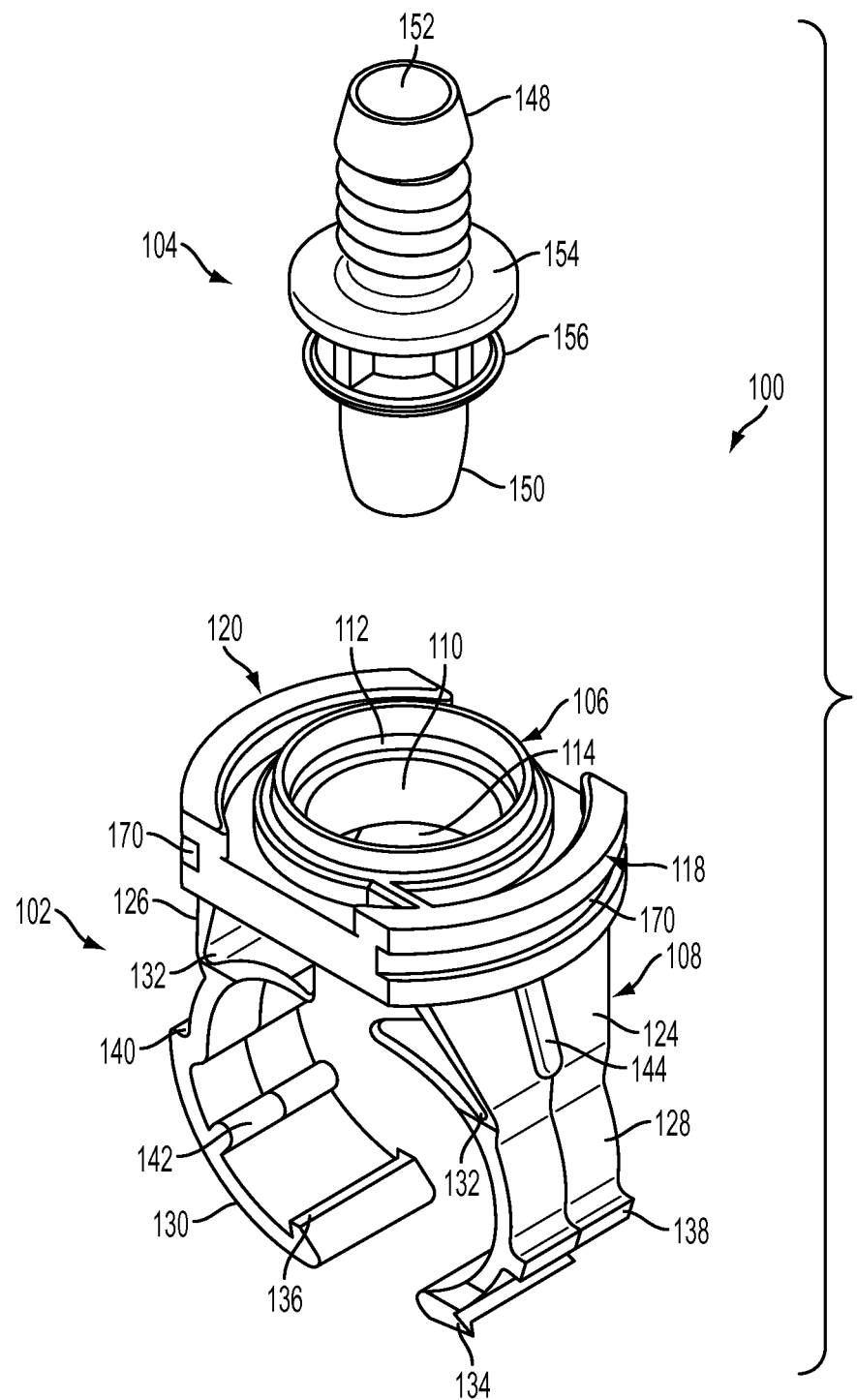
FIG. 3 is an exploded perspective view of the fitting if FIG. 2.
Figure 4:
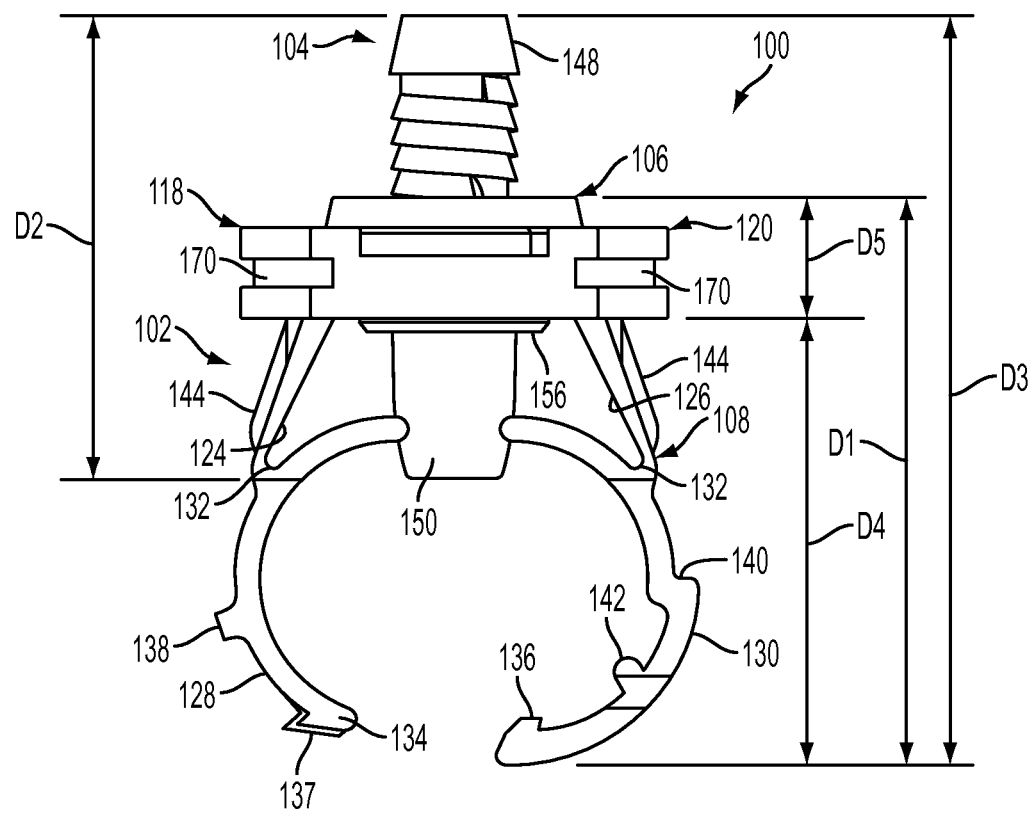
FIG. 4 is a front elevation view of the fitting of FIG. 2.

As shown in FIGS. 2-4, the saddle 102 of the fitting 100 includes a body 106 and a clamp 108. The clamp 108 is disposed generally below the body 106. In the illustrated fitting 100, the body 106 and the clamp 108 are integrally formed as one structure to define the saddle 102. Alternatively, the body 106 and the clamp 108 could be formed separately and then subsequently coupled together (e.g., welded together, mechanically coupled together, epoxied together, etc.) to form the saddle 102 within the scope of the present disclosure.

The body 106 of the saddle 102 is generally short and tubular in shape (although other sizes and/or shapes may be used within the scope of the present disclosure). A channel 110 (FIG. 3) extends generally longitudinally through the body 106 for receiving the tap 104 into the body 106. And, a seat 112 and a lip 114 are provided in the body 106 (generally within the channel 110) for coupling the tap 104 to the body 106 at a location in the channel 110. The body 106 also includes rim portions 118, 120 (e.g., groove portions, etc.) extending generally radially away from lateral sides of an upper end portion of the body 106. The rim portions 118, 120 allow for releasably coupling a press 122 (FIG. 7) to the fitting 100 for use in installing the tap 104 of the fitting 100 to the pipe 101 (specifically, for use in positioning the tap 104 within the pipe 101). This will be described in more detail hereinafter.

Figure 7:
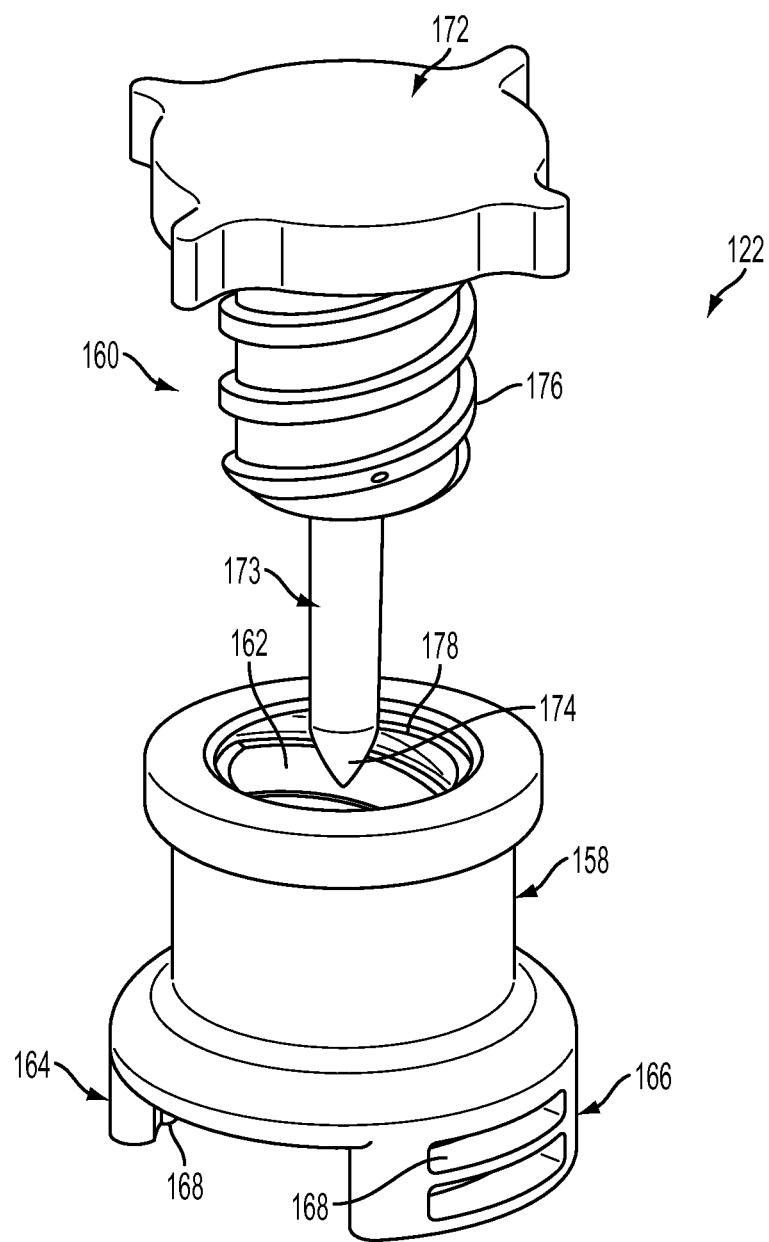
FIG. 7 is an exploded perspective view of a press according to an example embodiment of the present disclosure for use in installing a tap of the fitting of FIG. 2 into the pipe.
Figure 8:
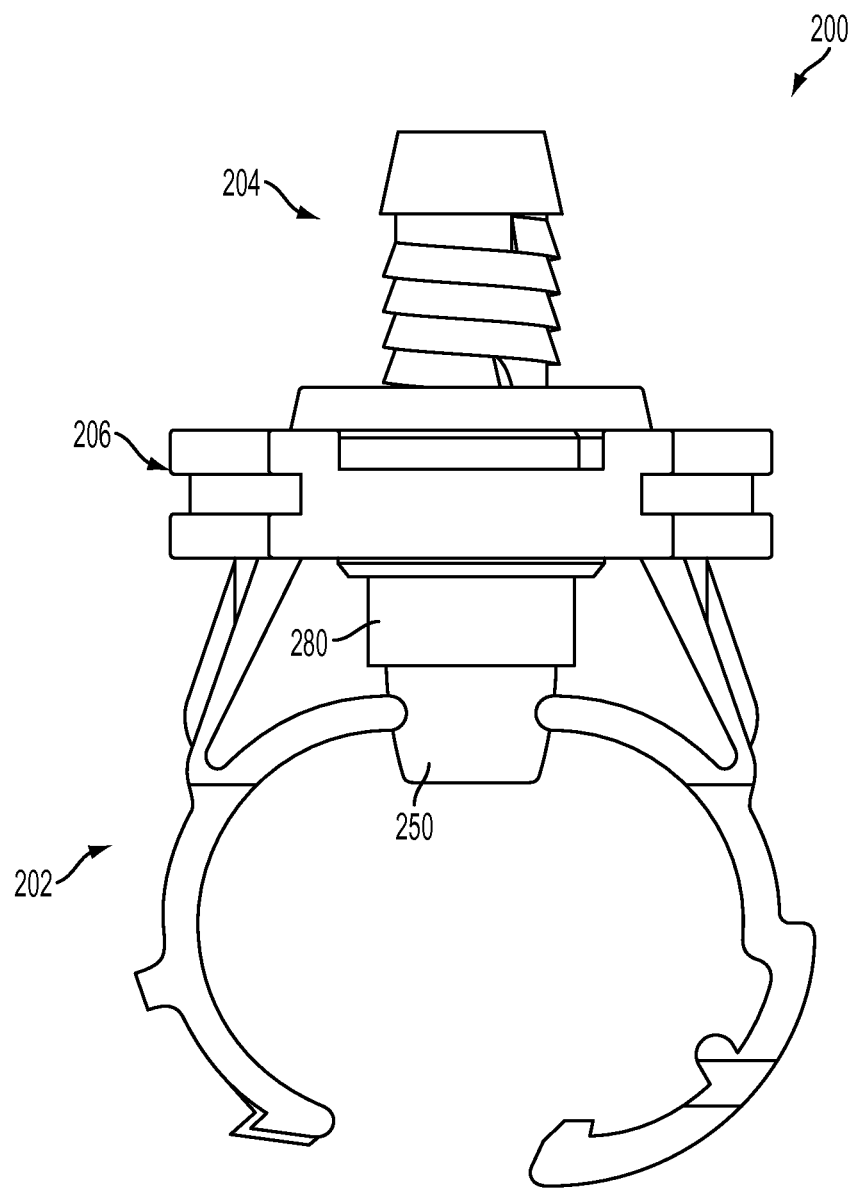
FIG. 8 is a front elevation view of a fitting according to another example embodiment of the present disclosure.
Figure 9:
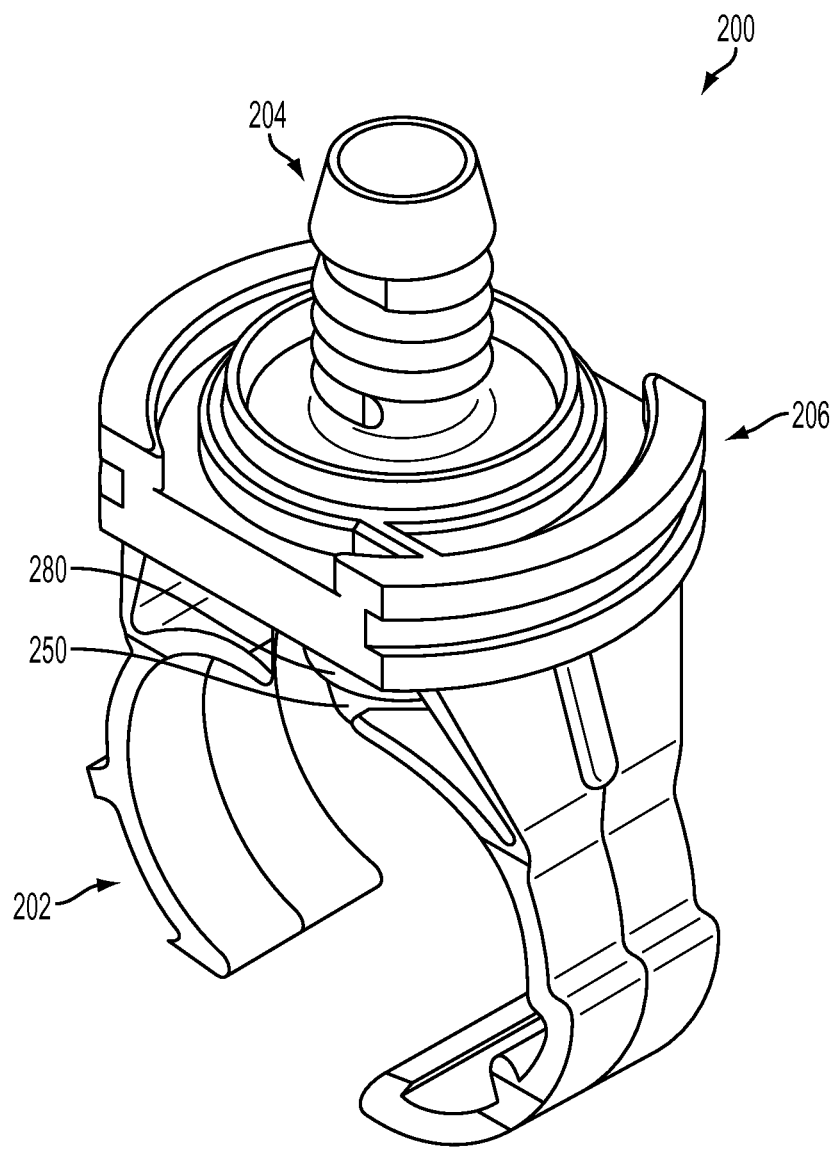
FIG. 9 is a perspective view of the fitting of FIG. 8.
Figure 10:
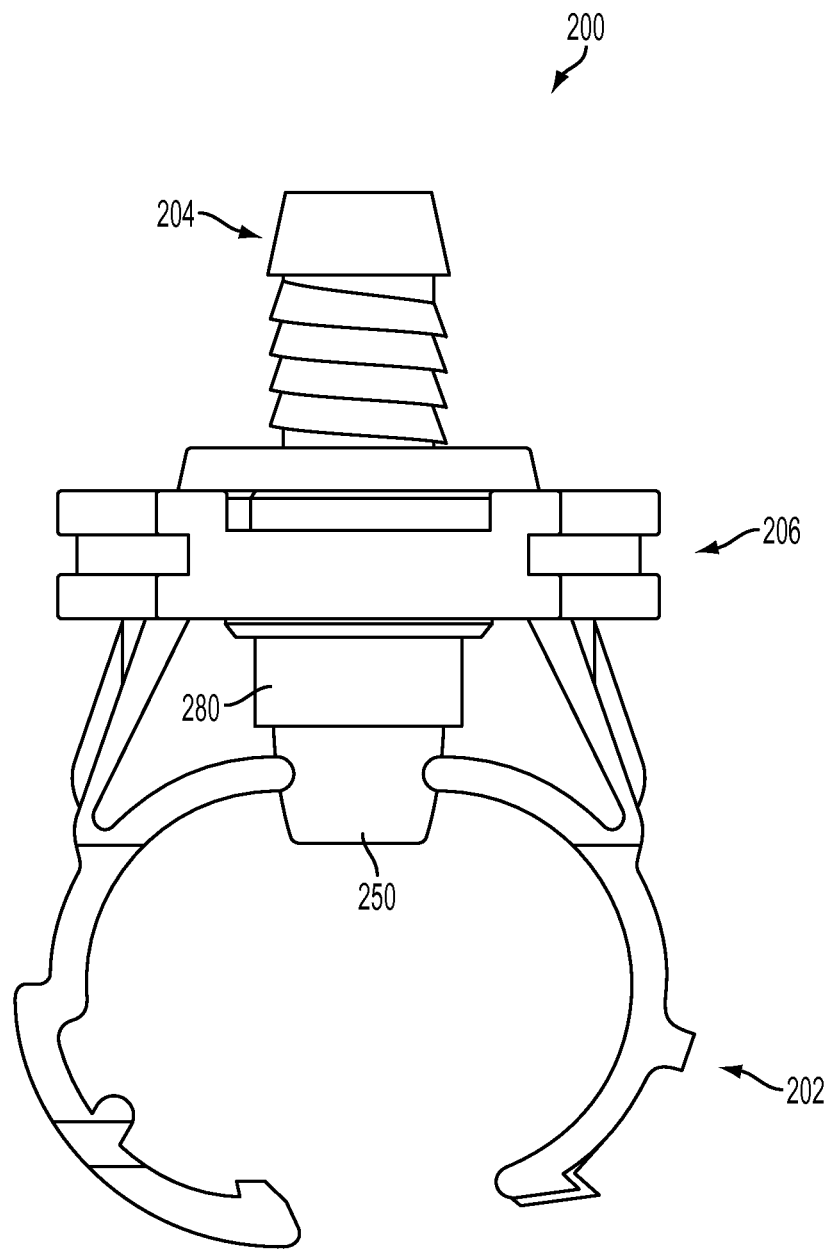
FIG. 10 is a rear elevation view of the fitting of FIG. 8.
Figure 11:
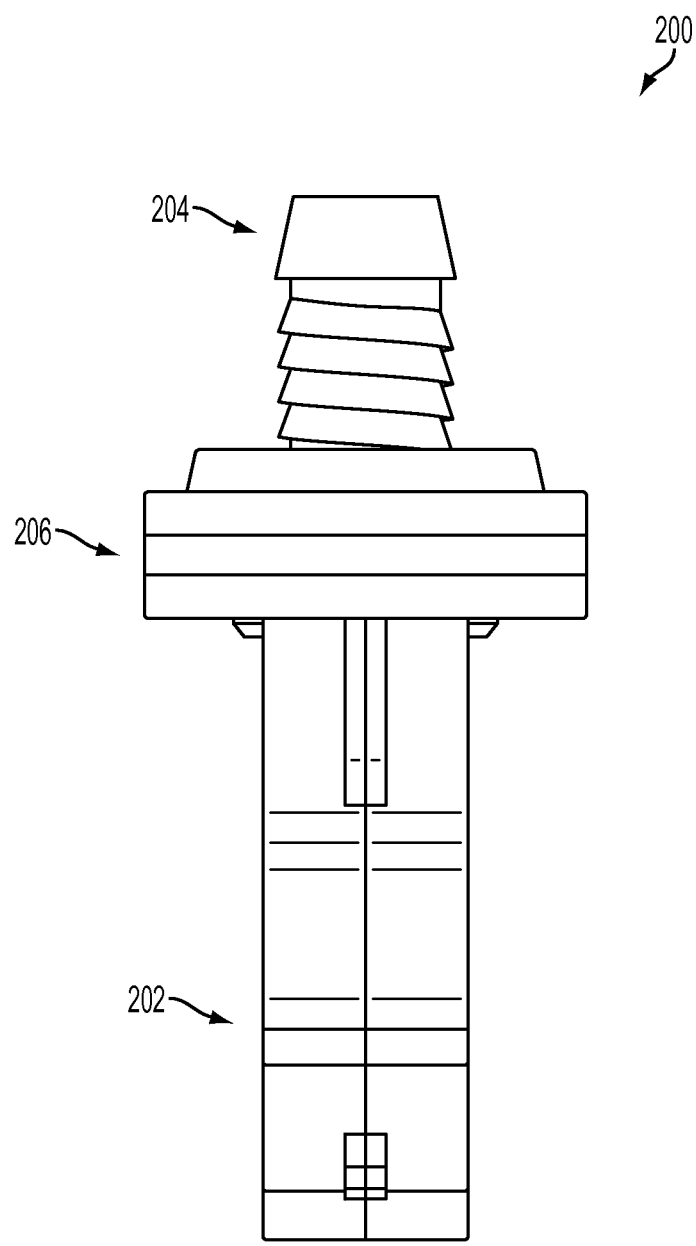
FIG. 11 is a left elevation view of the fitting of FIG. 8.
Figure 12:
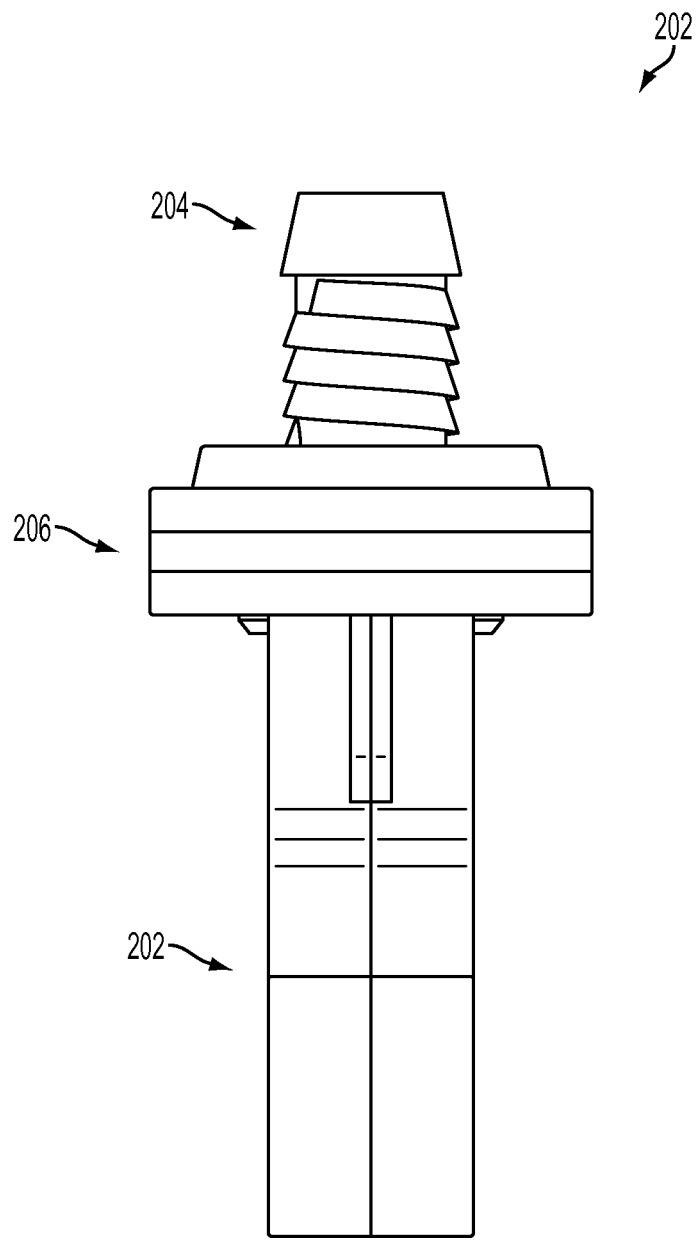
FIG. 12 is a right elevation view of the fitting of FIG. 8.
Figure 13:
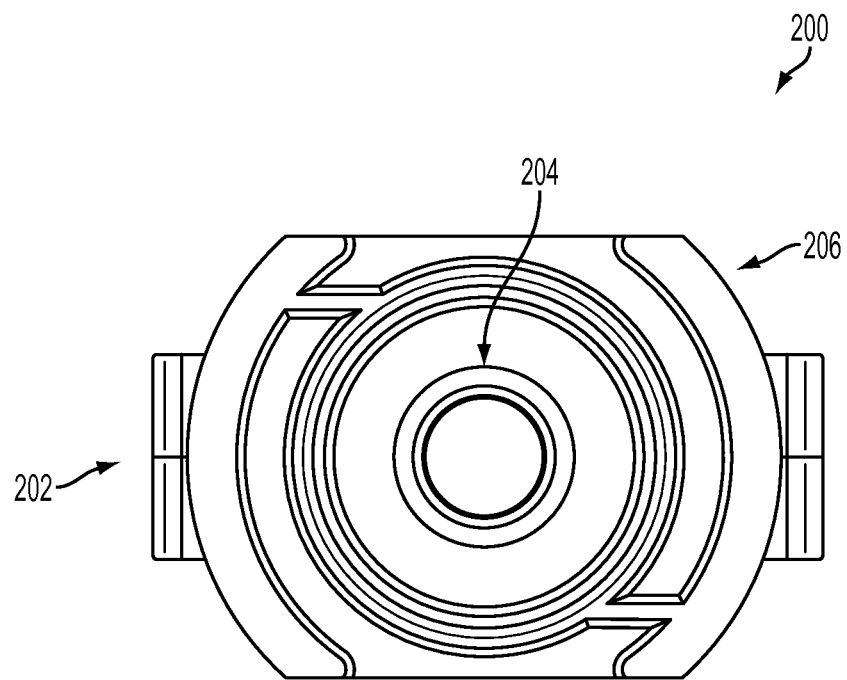
FIG. 13 is a top plan view of the fitting of FIG. 8.
Figure 14:
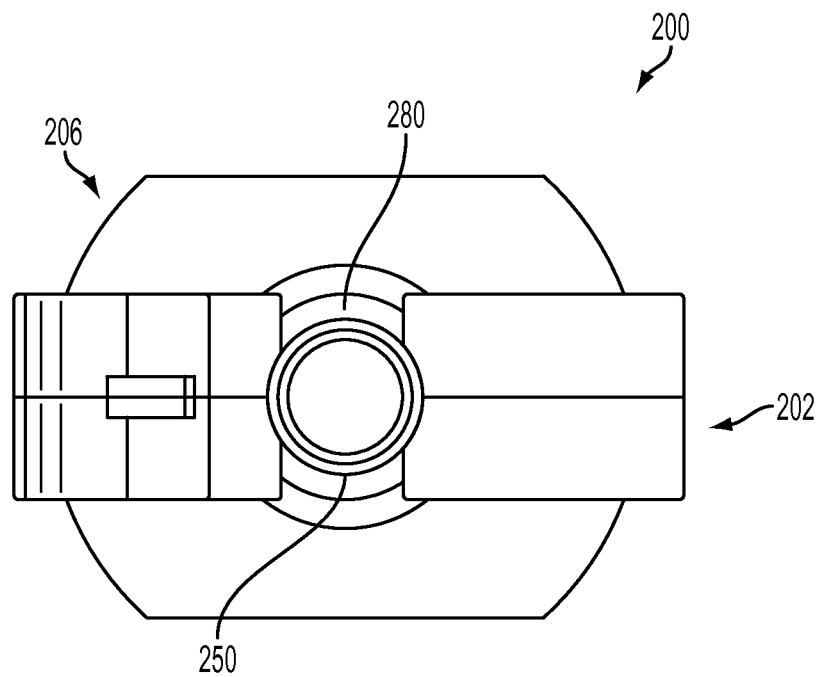
FIG. 14 is a bottom plan view of the fitting of FIG. 8.
Figure 15:
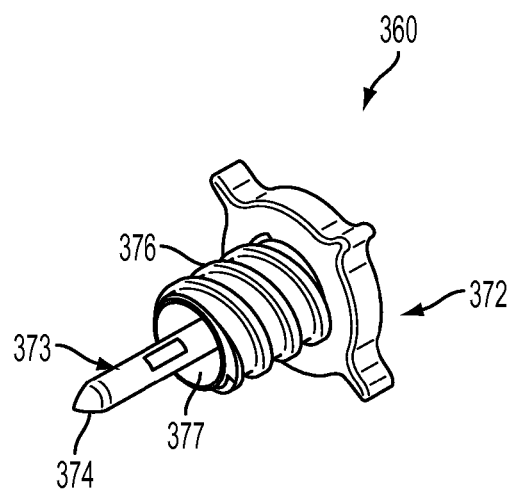
FIG. 15 is a perspective view of a spike according to another example embodiment of the present disclosure and suitable for use with the press of FIG. 7 for use in installing a tap of a fitting to a pipe.
Figure 16:
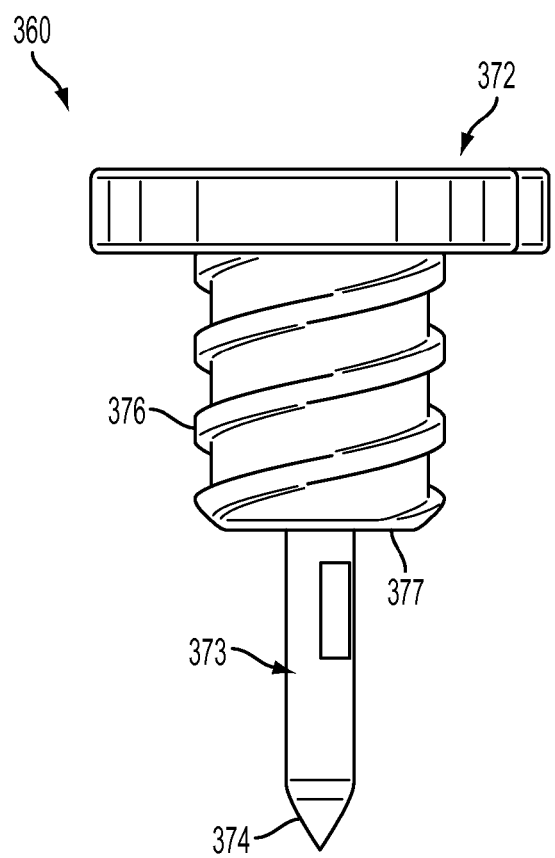
FIG. 16 is a front elevation view of the spike of FIG. 15.
Figure 17:
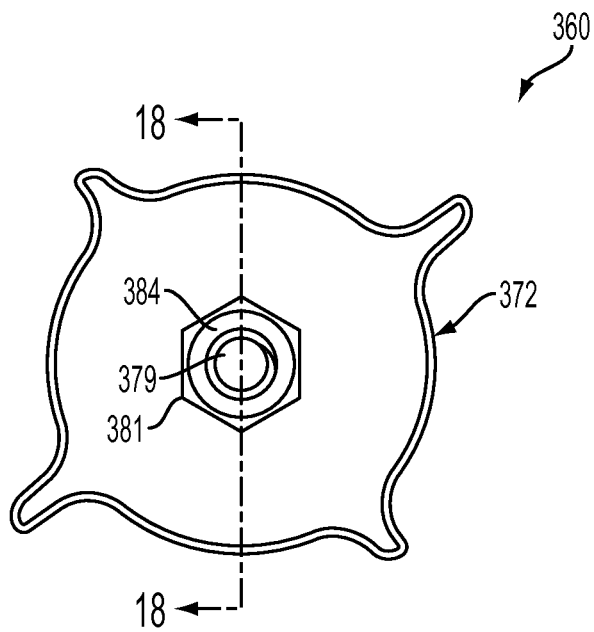
FIG. 17 is a top plan view of the spike of FIG. 15.
Figure 18:
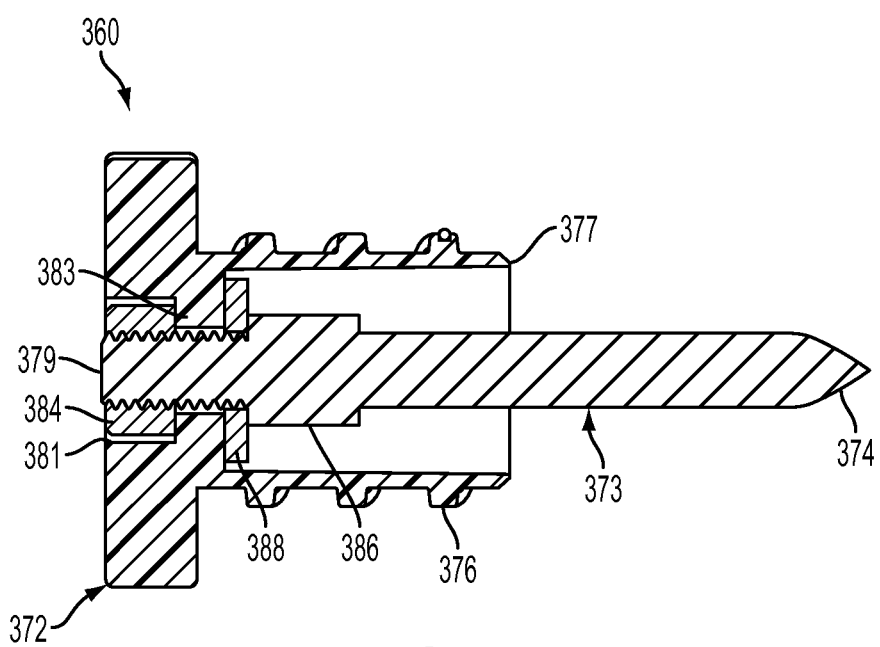
FIG. 18 is a section view of the spike of FIG. 15 taken in a plane including line 18-18 in FIG. 17.
Figure 19:
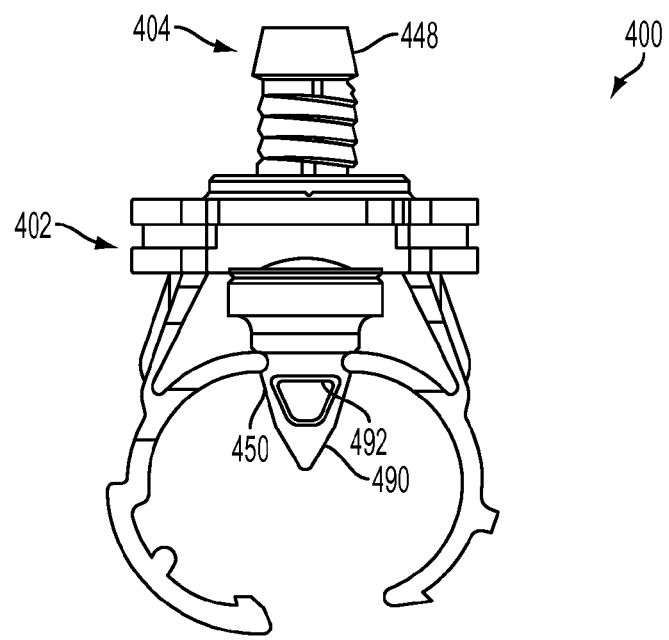
FIG. 19 is a front elevation view of a fitting according to another example embodiment of the present disclosure.
Figure 20:
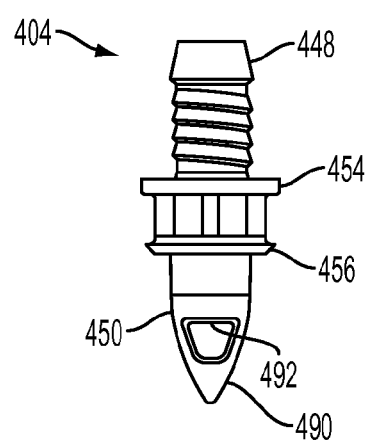
FIG. 20 is an elevation view of a tap of the fitting of FIG. 19.
Figure 21:
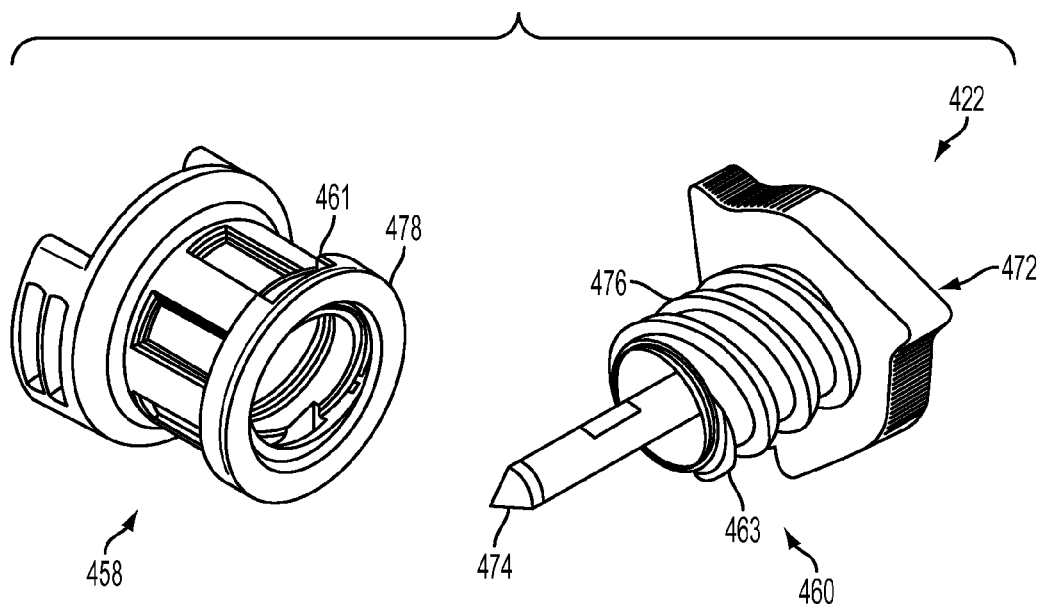
FIG. 21 is an exploded perspective view of the a press according to another example embodiment of the present disclosure and suitable for use with the fitting of FIG. 19.
Figure 22:
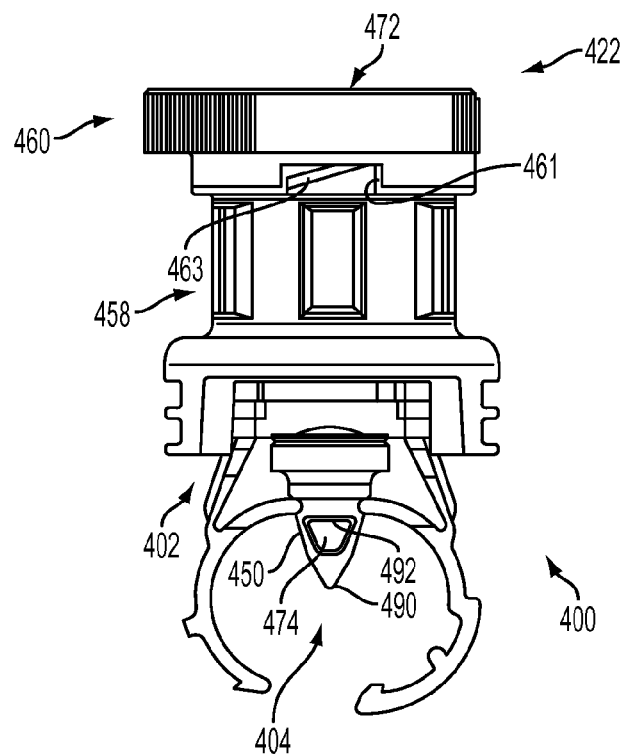
FIG. 22 is an elevation view of the press of FIG. 21 show installed to the fitting of FIG. 19.

The clamp 108 of the saddle 102 includes first and second arms 124, 126 extending generally away from the body 106, and jaw portions 128, 130 coupled to the arms 124, 126. The jaw portions 128, 130 are each generally arcuate in shape, and are each coupled to corresponding arms 124, 126 by hinges 132 (e.g., living hinges, mechanical hinges, etc.). This allows the jaw portions 128, 130 to move, flex, etc. relative to the arms 124, 126 when positioning the pipe 101 between the jaw portions 128, 130 (e.g., in preparation for coupling the saddle 102 to the pipe 101, etc.). Lips 134, 136 are provided on lower end portions of the jaw portions 128, 130 for use in holding, securing, etc. the jaw portions 128, 130 together when coupling the saddle 102 to the pipe 101. For example, the lower end portions of the jaw portions 128, 130 can be pushed together (flexing at the hinges 132) until the lips 134, 136 engage and secure the jaw portions 128, 130 together. In addition, the lip 134 of the jaw portion 128 includes a stop 137 (FIG. 4). The stop 137 is configured to help hold the lips 134, 136 engaged and help inhibit the lip 136 from inadvertently sliding off the lip 134, for example, when operating the press 122 to pierce the pipe 101 and install the tap 104 in the pipe 101 (e.g., when rotating a spike 160 of the press 122 relative to the fitting 100, etc.) (FIG. 7). Alternatively (or in addition), a stop could be positioned on the lip 136 of the jaw portion 130 within the scope of the present disclosure to help hold the lips 134, 136 engaged and help inhibit the lip 134 from inadvertently sliding off the lip 136 when installing the fitting 100 to the pipe 101.

In the illustrated embodiment, the jaw portion 128 coupled to the first arm 124 also includes an outer tab 138, and the jaw portion 130 coupled to the second arm 126 also includes a shoulder 140. The tab 138 and the shoulder 140 provide regions for grasping the jaw portions 128, 130 (e.g., by hand, with a tool (e.g., pliers, etc.), etc.) to move the jaw portions 128, 130 together to engage the lips 134, 136. In addition, a tab 142 is provided on an inner surface of the jaw portion 130 coupled to the second arm 126 to help engage (and compress) the pipe 101 received between the jaw portions 128, 130, and to help inhibit undesired turning, twisting, etc. of the pipe 101 in the clamp 108. And, ribs 144 are formed on the arms 124, 126 to help reinforce the arms 124, 126 against stresses resulting from flexing, moving, etc. the jaw portions 128, 130 relative to the arms 124, 126 (e.g., when coupling the saddle 102 to the pipe 101, etc.).

Also in the illustrated embodiment, the jaw portions 128, 130 are coupled to the arms 124, 126 at locations generally between end portions of the jaw portions 128, 130 (e.g., at locations about one third of a distance from upper end portions of the jaw portions 128, 130, at locations about 0.4 inches from upper end portions of the jaw portions 128, 130, etc.). Alternatively, the jaw portions 128, 130 could be coupled to the arms 124, 126 at upper end portions of the jaw portions 128, 130 within the scope of the present disclosure. Also in the illustrated embodiment, a spacing between the first and second arms 124, 126 is generally equal to or greater than an outside diameter of the pipe 101, although such a spacing is not required in all embodiments of the present disclosure.

Figure 5:
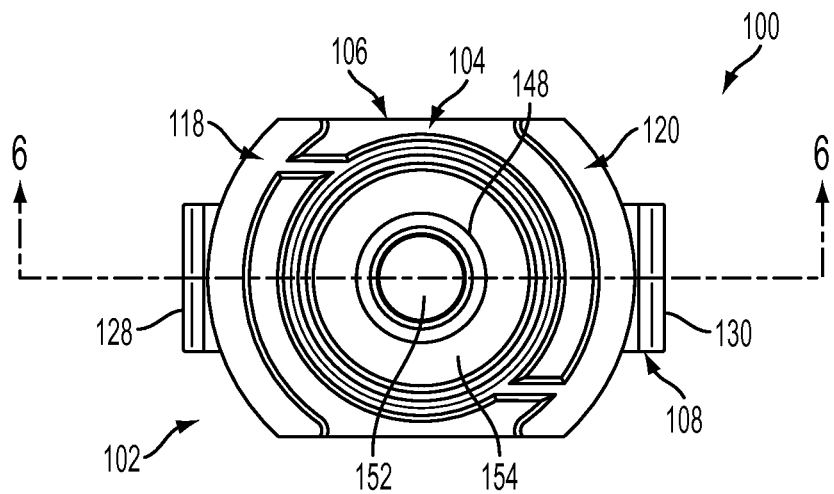
FIG. 5 is a top plan view of the fitting of FIG. 2.
Figure 6:
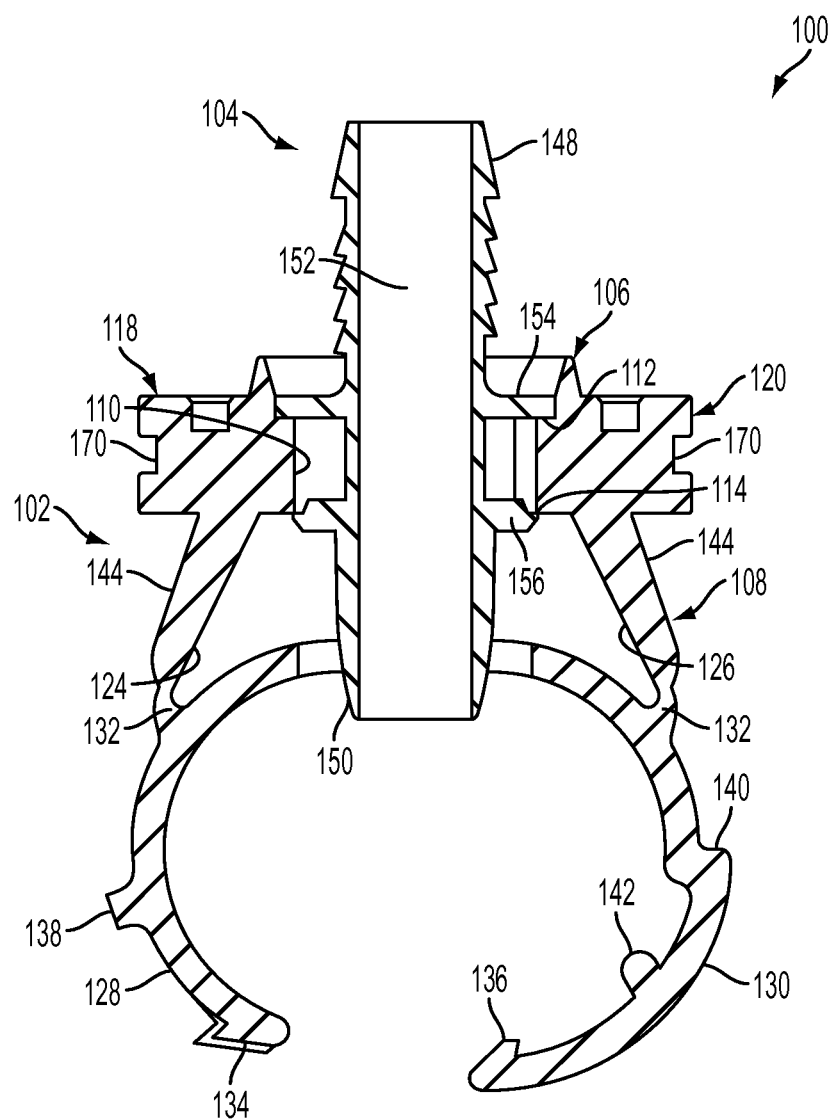
FIG. 6 is a section view of the fitting of FIG. 2 taken in a plane including line 6-6 in FIG. 5.

With additional reference now to FIGS. 5 and 6, the tap 104 of the illustrated fitting 100 is generally linear and cylindrical in shape (although other shapes may be used within the scope of the present disclosure, for example, elbow shapes, S-shapes, T-shapes, oval shapes, cube shapes, etc.) and includes an upper attachment portion 148 and a lower insert portion 150. The attachment portion 148 is configured to couple one or more other devices to the to the tap 104, for example, via flexible tubing, funny pipe, etc. to establish fluid communication between the fitting 100 and the one or more other devices. And, the insert portion 150 is configured to be inserted in the pipe 101 (e.g., via force from the spike 160 of the press 122 when installing the fitting 100 to the pipe 101, via force associated with ovalization of the pipe 101 pushing the pipe 101 against the tap 104 when installing the fitting 100 to the pipe 101, via force from a user manually pushing the tap 104 into the pipe 101, combinations thereof, etc.). A channel 152 extends through the tap 104 (and through the attachment portion 148 and the insert portion 150) for creating the fluid communication between the pipe 101 and the one or more other devices coupled to the attachment portion 148.

In the illustrated embodiment, the insert portion 150 of the tap 104 is generally tapered to help facilitate sealing the tap 104 with, against, etc. the pipe 101 in establishing the fluid communication (e.g., for polyethylene pipes, etc.). However, the insert portion 150 could alternatively be generally strait (with no taper), or generally pointed for piercing the pipe 101 when installing the tap 104 to the pipe 101. In addition, in some example embodiments a seal (e.g., a rubber grommet, a plastic grommet, an O-ring, etc.) (see, for example, seal 280 illustrated in FIGS. 8-14, etc.) may also be provided around the insert portion 150 of the tap 104 to help facilitate sealing the tap 104 with, against, etc. the pipe 101 in establishing the fluid communication (e.g., against an outer surface of the pipe 101, etc.) (e.g., for polyethylene pipes, polyvinyl chloride pipes, etc.). Also in the illustrated embodiment, the attachment portion 148 of the tap 104 includes barbs (and, for example, may be viewed as a barbed portion, etc.) for coupling the one or more other devices to the tap 104. However, other connecting means (e.g., threaded connecters, bayonet fittings, other connecting schemes, etc.) could be used within the scope of the present disclosure to create a fluid tight connection between the tap 104 and the one or more other devices.

The tap 104 also includes upper and lower flanges 154, 156 disposed generally between the attachment portion 148 and the insert portion 150. The flanges 154, 156 are configured to couple (e.g., secure, etc.) the tap 104 to the saddle 102 within the channel 110 of the saddle 102 when the fitting 100 is installed to the pipe 101. For example, the tap 104 can be initially positioned within the channel 110 of the saddle 102, with the attachment portion 148 extending generally upwardly from the saddle 102 and the insert portion 150 extending generally downwardly from the saddle 102 (FIG. 4), such that the upper flange 154 is partially disposed within the channel 110. This operates to help preliminarily hold the tap 104 and saddle 102 together (e.g., for packaging, for shipping, for positioning the fitting 100 relative to the pipe 101 in preparation for installing the fitting 100 to the pipe 101, etc.). Then, when the fitting 100 is installed to the pipe 101, the upper flange 154 is configured to move into the seat 112 in the channel 110 of the saddle 102, and the lower flange 156 is configured to fit (e.g., snap fit, etc.) under the lip 114 in the channel 110 of the saddle 102. As such, when the fitting 100 is installed to the pipe 101, at least part of the saddle 102 is received between the flanges 154, 156 to thereby snap-fit couple the tap 104 to the saddle 102. In other example embodiments, fittings may include taps with more than or fewer than two flanges for snap-fit coupling the taps within channels of saddles. In still other example embodiments, structure other than flanges (e.g., pins, friction based structures, fasteners, threads, etc.) may be used to couple (e.g., snap-fit couple, fixedly couple, thread, etc.) taps within channels of saddles.

With reference now to FIG. 7, the press 122 for installing (e.g., inserting, etc.) the tap 104 in the pipe 101 generally includes a housing 158 and the spike 160. The housing 158 is generally tubular in shape (although other shapes may be used within the scope of the present disclosure) and defines a channel 162 for selectively receiving the spike 160 in the housing 158. The housing 158 also includes guide portions 164, 166 (e.g., tongue portions, etc.) disposed toward a lower end portion of the housing 158 for use in releasably coupling the housing 158 (and the press 122) to the body 106 of the saddle 102 (when desired to pierce the pipe 101 and install the tap 104 of the fitting 100 into the pipe 101). In particular, tabs 168 of the guide portions 164, 166 are configured to be received in (e.g., rotated into, slid into, etc.) slots 170 of the rim portions 118, 120 of the saddle's body 106. The guide portions 164, 166 of the press's housing 158 and the rim portions 118, 120 of the saddle's body 106 are positioned so that when the press 122 is coupled to the saddle 102, the channel 162 of the press's housing 158 generally aligns with the channel 152 of the tap 104 (such that when the spike 160 is received in the channel 162 of the housing 158, at least part of it will also be received in the channel 152 of the tap 104). And, when desired (e.g., after piercing the pipe 101, etc.), the tabs 168 of the press's guide portions 164, 166 can be moved out of the slots 170 of the rim portions 118, 120 of the saddle's body 106 to disengage the press 122 from the fitting 100. The press 122 can then be used to install additional fittings to pipes, as desired. In other example embodiments, fittings may have rim portions with structure other than tabs (e.g., pins, friction based structures, openings, etc.) and/or presses may have guide portions with structure other than slots (e.g., openings, tabs, pins, friction based structures, etc.) configured to mate when desired to couple the presses to the fittings. In still other example embodiments, presses may include housings configured to couple to inner portions of saddles. For example, the saddles may include rim portions defined generally within channels, etc. of the saddles. And, the housings of the presses may include guide portions configured to releasably couple to the rim portions such that the housings couple to the saddles generally within channels of the saddles.

The spike 160 of the press 122 includes a grip portion 172, a shaft 173, and a generally pointed tip 174 disposed toward an end portion of the shaft 173 for piercing the pipe 101 (when installing the tap 104 into the pipe 101). External threads 176 are disposed generally below the grip portion 172 of the spike 160 and are configured to mate with internal threads 178 defined within the channel 162 of the housing 158. As such, when the press 122 is coupled to the saddle 102, the spike 160 can be received within the channel 162 of the housing (with the tip 174 of the spike 160 located at least partly within the channel 152 of the tap 104) and rotated (via the grip portion 172) to incrementally move the tip 174 of the spike 160 through the channel 152 of the tap 104 (via the threads 176, 178) to pierce the pipe 101 (and thereby allow the tap 104 to be inserted into the pierced pipe 101). The housing 158 and/or spike 160 of the press 122 can be constructed from suitable materials, for example, plastics, metals, combinations thereof, etc. In addition, the spike 160 may include a one-piece, construction such that the grip portion 172 and the shaft 173 are unitarily formed. Or, the spike 160 may be constructed from separate components (e.g., a separate grip portion 172, a separate shaft 173, etc.) that are then subsequently coupled together (see, for example, spike 360 illustrated in FIGS. 15-18, etc.).

In the illustrated embodiment, the grip portion 172 of the spike 160 includes wings for use in grasping, engaging, etc. the grip portion 172 (e.g., by hand, with a tool, etc.), for example, when inserting the spike 160 into the channel 162 of the press's housing 158. However, in other example embodiments, grip portions may be shaped differently as desired (e.g., with differently shaped wings, with different numbers of wings, without wings, etc.). In addition, the tip 174 of the spike 160 can be shaped as desired within the scope of the present disclosure. For example, the tip 174 may have a sharper point, for example, when used with pipes made of tougher material (e.g., polyvinyl chloride, etc.), or the tip 174 may have a greater radius of curvature when used with pipes made from less tough materials (e.g., polyethylene, polypropylene, etc.). Moreover, it should be appreciated that the tip 174 of the spike 160 may even be blunt, and still be able to weaken, pierce, etc. the pipe 101 as desired to allow insertion of the tap 104 into the pipe 101.

One example instillation of the fitting 100 to the pipe 101 will be described next. In this example, the tap 104 is initially positioned within the channel 110 of the saddle 102 with the upper flange 154 partially disposed within the channel 110 to help preliminarily hold the tap 104 and saddle 102 together in preparation for installation to the pipe 101. The saddle 102 is then positioned over the pipe 101 at a location desired to make fluid connection with the pipe 101. In particular, the jaw portions 128, 130 of the saddle 102 are positioned generally around the pipe 101. The lower end portions of the jaw portions 128, 130 are then moved together (e.g., pushed together (e.g., manually, with a tool such as a pliers, etc.) with a desired force (e.g., at least about thirty pounds of force, less than about thirty pounds of force, etc.), etc.) generally below the pipe 101. In so doing, the jaw portion 128 coupled to the first arm 124 moves generally over the jaw portion 130 coupled to the second arm 126. And, the outer lip 134 of the jaw portion 128 positions generally over, and generally behind (and generally in engagement with), the inner lip 136 of the jaw portion 130 to secure the jaw portions 128, 130 together. Cam surfaces on the lower end portions of the jaw portions 128, 130 help facilitate this relative movement. At this time, the jaw portions 128, 130 of the saddle 102 substantially surround at least part of the pipe 101 and hold it generally between the jaw portions 128, 130. In addition, the jaw portions 128, 130 generally compress the pipe 101 so that the pipe 101 assumes a generally oval cross sectional shape rather than a normal circular shape (see, for example, U.S. Pat. No. 6,986,532 (King), which is incorporated herein by reference). And, the insert portion 150 of the tap 104 is positioned adjacent (e.g., in contact with, etc.) the pipe 101 at a location generally between the upper end portions of the jaw portions 128, 130 of the saddle 102.

The press 122 is next coupled to the saddle 102 via the guide portions 164, 166 of the press's housing 158 and the rim portions 118, 120 of the saddle 102. In particular, the press's housing 158 is positioned generally over the rim portions 118, 120 of the saddle 102 and then rotated to releasably engage the tabs 168 of the guide portions 164, 166 in the slots 170 of the rim portions 118, 120. The tip 174 of the press's spike 160 is then positioned through the channel 162 of the press's housing 158 and within the channel 152 of the tap 104 (which is generally aligned with the channel 162 of the press's housing 158). And, the threads 176 of the spike 160 are engaged with the threads 178 in the channel 162 of the housing 158. The spike 160 is then rotated (via the grip portion 172) to move the tip 174 of the spike 160 through the tap 104 toward the pipe 101. Continued rotation of the spike 160 moves it into engagement with the pipe 101 and causes it to puncture the pipe 101. At about this time, the spike 160 also engages the tap 104 and moves (e.g., pushes, slides, etc.) the insert portion 150 of the tap 104 into the pipe 101 through the puncture made by the tip 174 of the spike 160. The spike 160 is then removed (e.g., unthreaded, etc.) from the press's housing 158, and the press's housing 158 is removed from the saddle 102 (e.g., rotated, etc. to disengage the guide portions 164, 166 of the press's housing 158 from the rim portions 118, 120 of the saddle 102). The tap 104 is thus installed in the pipe 101 in fluid communication with the pipe 101. And, the fitting 100 coupled to the pipe 101 is ready for use.

Another example instillation of the fitting 100 to the pipe 101 will be described next. In this example, the tap 104 is initially separated from the saddle 102, and the saddle 102 is then coupled to the pipe 101 as just described in the prior example instillation. The press 122 is next coupled to the saddle 102, as also just described in the prior example instillation, and the tip 174 of the press's spike 160 is then positioned through the channel 162 of the press's housing 158 and within the channel 110 of the saddle's body 106 (which is generally aligned with the channel 162 of the press's housing 158). The threads 176 of the spike 160 are engaged with the threads 178 in the channel 162 of the housing 158, and the spike 160 is rotated to move the tip 174 of the spike 160 into engagement with the pipe 101 causing it to puncture the pipe 101. The spike 160 is then removed (e.g., unthreaded, etc.) from the press's housing 158, and the press's housing 158 is removed from the saddle 102 (e.g., rotated, etc. to disengage the guide portions 164, 166 of the press's housing 158 from the rim portions 118, 120 of the saddle 102). The tap 104 is then positioned within the channel 110 of the saddle 102, with the insert portion 150 adjacent the pierced portion of the pipe 101, and pushed (e.g., manually, etc.) to move the insert portion 150 into the pipe 101. At the same time, the upper flange 154 of the tap 104 moves into the seat 112 of the saddle 102 and the lower flange 156 of the tap 104 snap fits under the lip 114 of the saddle 102. The tap 104 is thus installed in the pipe 101 in fluid communication with the pipe 101. And, the fitting 100 coupled to the pipe 101 is ready for use.

With that said, the illustrated fitting 100 is a generally low-profile fitting 100. For example, in some aspects, the saddle 102 of the fitting 100 may have a height dimension D1 of about 2.5 inches or less and the tap 104 of the fitting 100 may have a height dimension D2 of about 2.1 inches or less (FIG. 4). And, when the tap 104 is coupled to the saddle 102, the fitting 100 may have a height dimension D3 of about 3.3 inches or less (FIG. 4). In addition, the clamp 108 of the saddle 102 may have a height dimension D4 of about 2.0 inches or less, and the body 106 of the saddle may have a height dimension D5 of about 0.5 inches or less (FIG. 4). As such, in these aspects, the height dimension D5 of the body 106 of the saddle 102 may be substantially less than the height dimension D4 of the clamp 108 of the saddle 102. Further, as part of the low-profile aspect of the fitting 100 and saddle 102, the height D5 of the body 106 of the saddle 102 may have a value that is about one-half or less of the total height D1 of the saddle 102, or the height D5 of the body 106 of the saddle 102 may have a value that is about one-third or less of the total height D1 of the saddle 102, or the height D5 of the body 106 of the saddle 102 may even have a value that is about one-fourth or less of the total height D1 of the saddle 102, etc. However, it should be appreciated that in other aspects, the height D1 of the saddle 102 of the fitting 100 may be about 2.5 inches or more and/or the height D2 of the tap 104 of the fitting 100 may be about 2.1 inches or more, and when the tap 104 is coupled to the saddle 102, the height D3 of the fitting 100 may be about 3.3 inches or more. It should also be appreciated that in other aspects, the height D4 of the clamp 108 of the saddle 102 may be about 2.0 inches or more and/or the height D5 of the body 106 of the saddle 102 may be about 0.5 inches or more.

Also in the illustrated embodiment, the press 122 is separate from the fitting 100. As such, the press 122 is reusable, and can be used to install multiple different fittings (e.g., multiple ones of fitting 100, etc.) to pipes. In addition, the spike 160 of the press 122 generally provides a straight core pull in piercing the pipe 101, and is then removed from the tap 104 and the fitting 100. Only the tap 104 remains in the pipe 101 once the pipe 101 is pierced. As such, the spike 160 does not interfere with fluid flow through the pipe 101 and/or the tap 104. What's more, in some aspects of the present disclosure, the tap 104 is only positioned a short distance in the pipe 101 (e.g., about 0.25 inches or less, about 0.19 inches or less, about 0.13 inches or less, etc.) such that neither the tap 104 nor the spike 160 substantially interfere with flow of fluid through the pipe 101.

In addition in the illustrated embodiment, the channel 110 of the saddle's body 106 is free of threads. As such, nothing threads through the saddle 102 when using the fitting 100. Instead, the tap 104 snap-fits (via the flanges) within the channel 110 of the saddle's body 106 to thereby couple the tap 104 to the saddle 102 (e.g., when the fitting 100 is installed to the pipe 101, etc.). As can be appreciated, this feature helps allow the body 106 of the saddle 102 to be substantially shorter in height than in previous fittings (as neither the tap 104 nor the spike 160 are threaded to the saddle 102), and also helps provide, contribute to, etc. the low-profile of the fitting 100 (and the saddle 102). Also in the illustrated embodiment, the channel 152 extending through the tap 104 is free of threads. As such, the spike 160 of the press 122 (specifically, the tip 174 of the spike 160) freely moves through the tap's channel 152 when desired to pierce the pipe 101. In other example embodiments, the channel 152 extending through the tap may include threads.

The saddle 102 of the illustrated fitting 100 generally holds the pipe 101 in proper alignment for connection with the tap 104. In addition, the fitting 100 can be coupled to the pipe 101 in any desired orientation around the pipe 101. For example, the saddle 102 can be coupled to the pipe 101 with the tap 104 oriented generally vertically (with the low-profile aspect of the saddle 102 and fitting 100 allowing the pipe 101 and fitting 100 to be buried shallower and/or helping inhibit the fitting 100 from projecting above the surface of the ground when buried). Alternatively, the saddle 102 can be coupled to the pipe 101 with the tap 104 oriented generally horizontally, for example, to again allow the pipe 101 and fitting 100 to be buried shallower and/or to help inhibit the fitting 100 from projecting above the surface of the ground when buried.

What's more, in some example embodiments the saddle 102 of the illustrated fitting 100 is configured to compress the pipe 101 in one direction and generally elongate the pipe 101 in a transverse direction (i.e., a direction in which the tap 104 is inserted into the pipe 101), such that the deformed pipe 101 assumes a generally oval shape. This deformation of the pipe 101 helps facilitate placement of the tap 104 at least partly into the pipe 101. For example, such deformation helps ensure that the pipe 101 is securely held in the saddle 102, and also helps ensure that the irrigation line has a sufficient dimension for effective penetration by the tap 104. The deformation of the pipe 101 also allows the fitting 100 to be used with irrigation lines of different sizes, and may be helpful in smaller diameter pipes (e.g., pipes with inner diameters of less than about one inch, etc.).

FIGS. 8-14 illustrate another example embodiment of a fitting 200 including one or more aspects of the present disclosure. The fitting 200 is substantially similar to the fitting 100 previously described. For example, the fitting 200 generally includes a saddle 202 and a tap 204 (with a description thereof being substantially similar to that for the saddle 102 and tap 204 of fitting 100). In addition, the fitting 200 may be installed to a pipe using press 122, in a similar fashion to that described for fitting 100.

In this example embodiment, the fitting 200 further includes a seal 280 (e.g., a rubber grommet, a plastic grommet, an O-ring, etc.) disposed around an insert portion 250 of the tap 204 to help facilitate sealing the tap 204 with, against, etc. a pipe when the tap 204 is installed in the pipe (e.g., against pipe 101 illustrated in FIG. 1, against an outer surface of a pipe, etc.). And, when the fitting 200 is coupled to the pipe, the seal 280 is configured to be positioned, compressed, etc. generally against the pipe (e.g., generally between the saddle 202 (e.g., a lower surface of a body 206 of the saddle 202, etc.) and the pipe, etc. to thereby help hold the seal 280 in position against the pipe and help ensure the sealing of the tap 204 with, against, etc. the pipe).

FIGS. 15-18 illustrate another example embodiment of a spike 360 including one or more aspects of the present disclosure. The spike 360 is substantially similar to the spike 160 previously described (FIG. 7), and is suitable for use with the press 122 (FIG. 7) for use in installing a tap (e.g., tap 104, etc.) of a fitting (e.g., fitting 100, etc.) to a pipe. The spike 360 has a generally symmetrical shape and generally includes a grip portion 372, a shaft 373, and a tip 374 disposed toward an end portion of the shaft 373 for piercing the pipe (when desired to install a tap into the pipe). External threads 376 are disposed generally below the grip portion 172 and generally around a cylindrical body 377 of the grip portion 372. And, when the spike 360 is used with the housing 158 of the press 122 (FIG. 7), the threads 376 are configured to mate with the internal threads 178 defined within the channel 162 of the housing 158 for use in advancing the spike through the housing 158 for piercing the pipe.

With that said, in this embodiment the grip portion 372 and the shaft 373 of the spike 360 are separate components, and are coupled together by a fastener 384 (e.g., a threaded nut, etc.). The shaft 373 of the spike 360 is located generally through the cylindrical body 377 of the grip portion 372. A threaded end portion 379 of the shaft 373 is positioned in an upper opening 381 of the grip portion 372 generally above a rim 383 of the grip portion 372, and a lug 386 of the shaft 373 is positioned in the cylindrical body 377 generally below the rim 383. A washer 388 is located within the body 377 of the grip portion 372 adjacent the lug 386 of the shaft 373 to help resist movement of the shaft 373 upward through the upper opening 381, and the fastener 384 is configured to receive the threaded end portion 379 of the shaft 373 within the upper opening 381 to thereby secure the grip portion 372 and shaft 373 together. The grip portion 372 and the shaft 373 can be constructed from any suitable materials within the scope of the present disclosure including, for example, plastics, metals, combinations thereof, etc. In the illustrated embodiment, for example, the grip portion 372 is constructed from a plastic material and the shaft 373 is constructed from a metal material.

FIGS. 19-22 illustrate example embodiments of a fitting 400 and a press 422 including one or more aspects of the present disclosure. The fitting 400 and press 422 are similar to the fitting 100 and press 122 previously described, and may be used together (as previously described herein for fitting 100 and press 122) to install the fitting 400 to a pipe. However, it should be appreciated that the fitting 400 may also (or alternatively) be installed to a pipe using other presses (e.g., press 122, etc.), and/or the press 422 may also (or alternatively) be used to install other fittings (e.g., fitting 100, 200, etc.) to pipes.

As previously described for the fitting 100, the fitting 400 of this embodiment generally includes a saddle 402 and a tap 404. The saddle 402 is substantially the same as the saddle 102 of fitting 100 previously described, such that a further description of the saddle 402 will not be provided. The tap 404 generally includes an upper attachment portion 448 and a lower insert portion 450. The attachment portion 448 is configured to couple one or more other devices to the to the tap 404, and the insert portion 450 is configured to be inserted in the pipe. A channel extends through the tap 404 (and through the attachment portion 448 and the insert portion 450) for creating fluid communication between the pipe and the one or more other devices coupled to the attachment portion 448. The tap 404 also includes upper and lower flanges 454, 456 disposed generally between the attachment portion 448 and the insert portion 450 for coupling the tap 404 to the saddle 402 (in the same fashion as previously described for tap 104).

In this embodiment, the insert portion 450 of the tap 404 defines a point or tip 490 that helps facilitate insertion of the tap 404 in the pipe. In particular in this embodiment, the insert portion 450 may be used to pierce the pipe (instead of a spike 460 of the press 422) to thereby allow the tap 404 to be inserted into the pierced pipe for establishing the fluid communication with the pipe (via opening 492 in the insert portion 450). For example, the press 422 may simply be used to push the tap 404 into the pipe. Alternatively, the press 422 may be used to initially pierce the pipe, and the tap 404 may then be installed to the saddle 402 and the pipe as previously described herein. Also in this embodiment, a grip portion 472 of the spike 460 includes three wings for use in grasping, engaging, etc. the grip portion 472 (e.g., by hand, with a tool, etc.), for example, when operating the spike 460 to insert the tap 404 in the pipe.

Further in this embodiment, the housing 458 of the press 422 includes windows 461 for locking legs 463 on the spike 460 of the press 422. The windows 461 allow the locking legs 463 to be received and/or viewed through the windows 461, for example, when the spike 460 is coupled to the housing 458. In this manner, the locking legs 463 may be used to help confirm proper fit/operation of the press 422, etc.

In an example use of the fitting 400, the tap 404 is initially positioned in the saddle 402 and the saddle 402 is then positioned over the pipe (as previously described for fitting 100). The press 422 is coupled to the saddle 402 (FIG. 22), as previously described, with a tip 474 of the press's spike 460 positioned through a housing 458 of the press 422 and within the tap 404. Threads 476 of the spike 460 are engaged with threads 478 of the housing 458, and the spike 460 is then rotated (via the grip portion 472) to move it into engagement with the tap 404. Continued rotation of the spike 460 pushes the tip or point 490 of the tap 404 into engagement with the pipe and causes it to puncture the pipe. At about this time, the spike 460 also moves (e.g., pushes, slides, etc.) the insert portion 450 of the tap 404 into the pipe through the puncture made by the tip or point 490. The spike 460 is then removed (e.g., unthreaded, etc.) from the press's housing 458, and the press's housing 458 is removed from the saddle 402. The tap 404 is thus installed in the pipe in fluid communication with the pipe. And, the fitting 400 coupled to the pipe is ready for use. In some variations of this embodiment, the spike 460 of the press 422 may not include a tip (as, in this embodiment, the tip 474 of the spike 460 may not be required to pierce the pipe because the tap 404 includes the tip or point 490).

Figure 23:
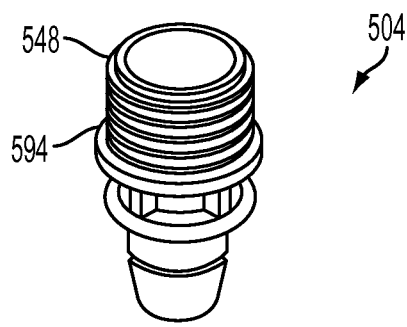
FIG. 23 is a perspective view of a tap according to an example embodiment of the present disclosure.

FIG. 23 illustrates another example embodiments of a tap 504 including one or more aspects of the present disclosure. The tap 504 may be used with any of the fittings (e.g., fitting 100, 200, 400, etc.) disclosed therein. The tap 504 of this embodiment is substantially similar to the tap 100 previously described. A description of similar features for the tap 104 and tap 504 will not be repeated. In this embodiment, an upper attachment portion 548 of the tap 504 includes a threaded portion 594 for use in coupling the tap 504 to one or more other devices and establishing fluid communication between fitting incorporating the tap 504 and the one or more other devices.

Figure 24:
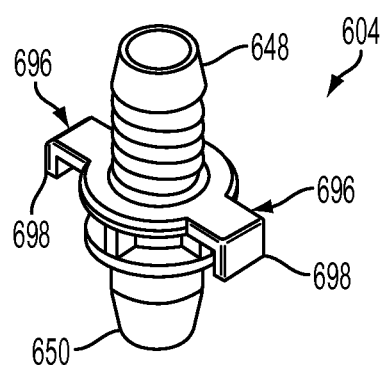
FIG. 24 is a perspective view of a tap according to another example embodiment of the present disclosure.

FIG. 24 illustrates another example embodiments of a tap 604 including one or more aspects of the present disclosure. Again, the tap 604 may be used with various fittings disclosed therein. The tap 604 is similar to the tap 104 previously described. A description of similar features between the tap 104 and the tap 604 will not be repeated. In this embodiment, the tap 604 includes flanges 696 extending generally away from the tap 604 for coupling the tap 604 to a saddle. The flanges 696 are located generally between an upper attachment portion 648 and a lower insert portion 650. And, when the tap 604 is positioned within a channel of a saddle, end portions 698 of the flanges 696 extend generally outside of the saddle to engage an outer portion of the saddle and thereby hold (e.g., snap-fit, etc.) the tap 604 and saddle together (e.g., to thereby couple the tap 604 to the saddle at a location outside a channel of the saddle, etc.).

Example embodiments have been provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Specific dimensions included herein are exemplary in nature and do not limit the scope of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fitting for pipes, the fitting comprising:
   a saddle for coupling the fitting to a pipe, the saddle defining a channel extending generally longitudinally through the saddle, the channel being free of threads;
   a tap for establishing fluid communication between the fitting and the pipe, the tap configured to fit within the channel of the saddle and couple to the saddle; and
   a press for installing the tap in the pipe, the press configured to couple to the saddle of the fitting and pierce the pipe to thereby allow the tap to be inserted into the pierced pipe for establishing the fluid communication between the fitting and the pipe, the press further configured to uncouple from the saddle of the fitting after the tap is inserted into the pierced pipe and while the tap remains inserted in the pierced pipe.

2. The fitting of claim 1, wherein the tap includes a portion configured to couple the tap to one or more other devices and establish fluid communication between the fitting, the pipe, and the one or more other devices.

3. The fitting of claim 2, wherein the tap defines a channel extending through the tap for establishing the fluid communication between the fitting, the pipe, and the one or more other devices, and wherein the channel defined by the tap is free of threads; and
   wherein the press includes a shaft configured to removably extend into the channel of the tap when piercing the pipe.

4. The fitting of claim 3, wherein the tap includes an insert portion configured to be positioned in the pipe to thereby establish the fluid communication between the fitting, the pipe, and the one or more other devices; and
   further comprising a seal disposed at least partly around the insert portion of the tap to thereby facilitate sealing the tap with the pipe when establishing the fluid communication.

5. The fitting of claim 1, wherein the insert portion is configured to extend about 0.25 inches or less into the pipe when establishing the fluid communication.

6. The fitting of claim 1, wherein the tap includes at least one flange configured to couple the tap to the saddle outside the channel of the saddle.

7. The fitting of claim 1, wherein the tap includes at least one flange configured to engage the saddle to thereby couple the tap to the saddle within the channel of the saddle.

8. The fitting of claim 7, wherein the at least one flange of the tap includes two flanges, and wherein the two flanges are configured to receive at least part of the saddle therebetween to thereby snap-fit couple the tap to the saddle within the channel of the saddle.

9. The fitting of claim 1, wherein the saddle includes first and second jaw portions configured to engage for coupling the fitting to a pipe, the first jaw portion and/or the second jaw portion having a stop configured to inhibit the first and second jaw portions from inadvertently sliding apart.

10. A fitting for pipes, the fitting comprising:
    a saddle for coupling the fitting to a pipe, the saddle defining a channel extending generally longitudinally through the saddle; and
    a tap for establishing fluid communication between the fitting and the pipe, the tap being free of threads and configured to snap-fit couple to the saddle within the channel of the saddle;

wherein the saddle includes first and second rigid, arcuate jaw portions extending around greater than half of the circumference of the pipe to compress the pipe.

11. The fitting of claim 10, wherein the tap includes a portion configured to couple the tap to one or more other devices and establish fluid communication between the fitting, the pipe, and the one or more other devices.

12. The fitting of claim 10, wherein the tap includes an insert portion configured to be positioned in the pipe to thereby establish the fluid communication between the fitting and the pipe, the fitting further comprising a seal disposed at least partly around the insert portion of the tap to thereby facilitate sealing the tap with the pipe when establishing the fluid communication.

13. The fitting of claim 10, wherein the tap includes at least one flange configured to engage the saddle to thereby snap-fit couple the tap to the saddle within the channel of the saddle.

14. The fitting of claim 10, wherein the saddle includes a body and a clamp defining the first and second jaw portions, the body defining the channel extending generally longitudinally through the saddle, and the clamp configured to couple the saddle to a pipe, the body defining a height that is less than a height of the clamp.

15. A press for installing a fitting to a pipe for establishing fluid communication between the fitting and the pipe, the press comprising:
a housing configured to releasably couple to the fitting, the housing defining a channel extending through the housing; and
a spike configured to releasably couple to the housing and extend at least partly through the fitting for piercing the pipe to thereby allow at least part of the fitting to be inserted into the pipe through the piercing in the pipe for establishing the fluid communication between the fitting and the pipe;
wherein the channel of the housing includes threads and wherein the spike includes corresponding threads such that the spike can be threaded through the channel of the housing to thereby advance the spike through the housing.

16. The press of claim 15, wherein the housing includes at least one guide portion configured to releasably couple the housing to the fitting.

17. The press of claim 16, wherein the at least one guide portion of the housing includes at least one tab configured to engage the fitting to thereby releasably couple the housing to the fitting.

18. The press of claim 15, wherein the spike includes a grip portion, a shaft, and a fastener coupling the shaft to the grip portion.

19. The press of claim 18, wherein the shaft includes a threaded end portion and a tip end portion, the fastener configured to couple to the threaded end portion of the shaft to thereby couple the shaft to the grip portion.

20. The press of claim 15, wherein the housing includes first and second tongue portions disposed towards a lower end portion of the housing for releasably coupling the housing to the fitting.

21. The press of claim 20, wherein each of the tongue portions includes at least one tab configured to be received in a slot of the fitting.

22. The press of claim 15, wherein the housing is adapted to maintain a fixed position relative to the fitting as the spike is advanced through the housing.

* * * * *